PROCESS FOR TREATMENT OF MEATS, SAUSAGE PRODUCTS, AND INTESTINES

Wilhelm Bickel, Mannheim, Germany, assignor to Calgon, Incorporated, Pittsburgh, Pa., a corporation of Pennsylvania No Drawing. Application May 16, 1952, Serial No. 288,333

Claims priority, application Germany May 19, 1951

6 Claims. (Cl. 99—107)

This invention refers to a process for the treatment of meats and sausage products and intestines, and serves to preserve the treated goods and keep them fresh, at the same time reducing the tendency of the sausage meat to adhere or stick to the intestines.

In the warm seasons of the year, in spite of all precautions which may be taken, fresh sausage or meats oxidize after a few hours and become slightly glutinous or smeary on the surface. The known method of combating this tendency consists essentially in washing such meat or sausage with hot water or a salt solution. In spite of this washing, only a limited degree of success is obtained which even in the best of circumstances, is only of very short duration. It is particularly noticeable that the meat or sausage loses its normally appetizing color, and the treated meats become gray and dull in appearance and likewise suffer also a distinguishable loss in flavor and taste.

Improved results have been obtained through treatment of the meat or sausage meat with a dilute solution of tartaric acid but these results I have found have not been entirely satisfactory. In addition, it is also a practice to rinse sausage intestines in a lactic acid solution so that the intestines can more easily be removed from the sausage mass itself.

According to my invention, the solution of this difficult problem consists in washing meat and sausage products primarily for the purpose of preservation, in an aqueous solution which contains in addition to a palatable acid such as tartaric acid, a water-soluble compound of a polymeric phosphoric acid. This process provides not only a thorough and an unusually long-lasting degree of preservation, but also even dull and somewhat glutinous meats again regain completely their normal appearance and taste. In addition, meats so treated may also be more readily removed from the intestine envelope itself. This latter effect can be even further increased by rinsing the intestines before they are used as an envelope with a solution of the same composition, or by letting them stand in it for a short time.

I have also found that in removing the mucous membrane from the natural intestines, a surprising effect can be obtained with my preferred solution. If for instance, intestines washed in the usual maner are for a short time immersed in a 1 percent by weight solution of a palatable acid and a polymeric phosphate compound at approximately 70° C., the intestines lose their normally prevailing brownish color, and the mucous membrane can be removed more quickly and more completely than in untreated intestines. Furthermore, in this manner the fermentation of the intestines often observed in the removal of the mucous membrane is avoided. The thus pretreated intestines show much less tendency to swell than those which are untreated by my process.

The performance of this process is surprisingly simple. To remove the mucous membrane from the intestine, a solution containing from about 1 percent to about 2 percent of the composition according to the invention is sufficient. For the washing of meat and sausage products, I prefer to use a stronger solution, containing about 5 percent by weight of the composition. For the rinsing of the intestines before stuffing them with the sausage meat, a solution containing from about 2 to about 3 percent of my composition is adequate. This process makes the intestine more elastic, the sausage can breathe more readily, and such intestines can be better removed at a later time from the sausage meat. They have also become by this treatment more resistant to attack by undesirable bacteria both on the inner side and on the outer side of the intestine wall.

Of the palatable acids which I may employ, citric, tartaric, lactic, and adipic are most suitable. Among the polymeric phosphate compounds, the alkali-metal salts of the pyro- and hexametaphosphoric acids are to be understood as being contemplated as well as the different salts of the different polyphosphoric acids such as the tripolyphosphoric acid and the tetraphosphoric acid. Also, the potassium metaphosphates which are normally water-insoluble may be water solubiilzed by the usual means well known to the art. These salts are designated frequently as Kurrol salts.

Example

Glutinous sausages are immersed for a short time in hot water and then for at least five minutes in a solution containing 5 percent by weight of a mixture consisting of 80 percent by weight of tartaric acid and 20 percent by weight of sodium hexametaphosphate. After this immersion, the sausages are removed and drained thoroughly. After this treatment, the sausages have regained a fresh and appetizing appearance and also have a good taste. If the same sausages are immersed in hot water alone or in a dilute solution of tartaric acid without addition of the phosphate, they rapidly become gray and dull after a short time. The sausages treated by my process retain the original good appearance even after long storage. Generally speaking, I may use from about 2 percent to about 10 percent by weight of the mixture of 80 percent tartaric acid and 20 percent sodium hexametaphosphate in my process.

Having thus described my invention, what I claim as new and desire to secure by Letters Patent of the United States is:

I claim:

1. A method for the treatment of meat and sausage products and intestines of any kind which comprises treating said products with a solution which contains from about 2 percent to about 10 percent by weight of a mixture comprising 80 parts by volume of tartaric acid and 20 parts by volume of sodium hexametaphosphate.

2. The method as described in claim 1 wherein the treating solution contains approximately 5 percent by weight of a mixture comprising 80 parts by volume of tartaric acid and 20 parts by volume of sodium hexametaphosphate.

3. The method according to claim 1 in which intestines are immersed in a hot solution containing from about 2 percent by weight to about 10 percent by weight of a mixture comprising approximately 80 parts by volume of tartaric acid and 20 parts by volume of sodium hexametaphosphate whereupon the removal of the mucous membrane from the intestine is readily accomplished.

4. A method of reducing the inherent tendency of sausage meat to adhere to the casing in which it is subsequently encased which comprises washing the sausage meat in an aqueous solution containing from about 2 percent by weight to about 10 percent by weight of a mixture of tartaric acid and sodium hexametaphosphate, the ratio of the latter components being about 4 parts tartaric acid to about 1 part sodium hexametaphosphate.

5. A method of treating meat and sausage products and intestines of any kind which comprises treating said products with a solution containing from about 1 percent by weight to about 10 percent by weight of a mixture of (a) a compound selected from the group consisting of the palatable acids and (b) a polymeric phosphate, the ratio of (a) to (b) being about 4 to 1.

6. The method according to claim 5 wherein the solution contains about 5 percent of the mixture of $(a)+(b)$.

References Cited in the file of this patent

UNITED STATES PATENTS

| | | |
|---|---|---|
| 2,117,478 | Hall | May 17, 1938 |
| 2,513,094 | Hall | June 27, 1950 |